United States Patent
Jasmin

(10) Patent No.: US 12,003,205 B2
(45) Date of Patent: Jun. 4, 2024

(54) DEVICE AND SYSTEM FOR MOUNTING SOLAR PANELS TO ROOFS AND THE LIKE

(71) Applicant: Sunmodo Corporation, Vancouver, WA (US)

(72) Inventor: Roland Jasmin, Portland, OR (US)

(73) Assignee: Sunmodo Corporation, Vancouver, WA (US)

( * ) Notice: Subject to any disclaimer, the term of this patent is extended or adjusted under 35 U.S.C. 154(b) by 110 days.

(21) Appl. No.: 17/806,487

(22) Filed: Jun. 12, 2022

(65) Prior Publication Data

US 2023/0402958 A1 Dec. 14, 2023

(51) Int. Cl.
*H02S 20/23* (2014.01)
*F16B 2/14* (2006.01)
*H02S 30/10* (2014.01)

(52) U.S. Cl.
CPC ............... *H02S 20/23* (2014.12); *F16B 2/14* (2013.01); *H02S 30/10* (2014.12)

(58) Field of Classification Search
CPC .. H02S 20/23; H02S 30/10; F16B 2/14; F24S 2025/6003; F24S 25/33; F24S 25/632; F24S 25/636; Y02E 10/47; Y02E 10/50
See application file for complete search history.

(56) References Cited

U.S. PATENT DOCUMENTS

| 2,584,614 | A | 2/1949 | Rasmussen et al. |
| 3,039,161 | A | 8/1960 | Gagnon |
| 3,325,227 | A | 6/1967 | Hunter |
| 3,591,211 | A | 7/1971 | Richey |
| 3,847,495 | A | 11/1974 | Peter et al. |
| 4,199,908 | A | 4/1980 | Teeters |
| 4,901,963 | A | 2/1990 | Yoder |
| 5,609,436 | A | 3/1997 | Jou |
| 7,963,077 | B2 | 6/2011 | Lin |
| 8,070,119 | B2 | 12/2011 | Taylor |
| 8,376,298 | B2 | 2/2013 | McPheeters |
| 8,480,330 | B2 | 7/2013 | Urban et al. |
| 8,534,625 | B2 | 9/2013 | Heath et al. |
| 8,585,000 | B2 | 11/2013 | McPheeters |
| 8,713,881 | B2 * | 5/2014 | DuPont ................... F24S 25/30 52/173.3 |

(Continued)

FOREIGN PATENT DOCUMENTS

| CN | 202189803 U | 4/2012 |
| CN | 102891198 A | 1/2013 |

(Continued)

OTHER PUBLICATIONS

Power Rail Universal End Clamp Addendum, SP3573, Mar. 2020, Preformed Line Products Company., Cleveland, Ohio.

(Continued)

*Primary Examiner* — Amy J. Sterling
(74) *Attorney, Agent, or Firm* — Stone Creek Services LLC; Alan M Flum

(57) ABSTRACT

A device and system for mounting a solar panel return flange to a rail. The device can include a clamp body and a clamping mechanism. With the clamp body receiving the solar panel return flange and the rail, the clamping mechanism can press the rail upward against the return flange and secure the solar panel to the rail.

17 Claims, 15 Drawing Sheets

(56) References Cited

U.S. PATENT DOCUMENTS

| | | | |
|---|---|---|---|
| 8,745,935 B2 * | 6/2014 | DuPont | F24S 25/615 |
| | | | 52/173.3 |
| 8,756,870 B2 | 6/2014 | Teller et al. | |
| 8,894,424 B2 * | 11/2014 | DuPont | H02S 20/22 |
| | | | 439/95 |
| 8,910,928 B2 | 12/2014 | Header | |
| 9,080,792 B2 | 7/2015 | Patton et al. | |
| 9,281,428 B2 | 3/2016 | Newman et al. | |
| 9,331,629 B2 | 5/2016 | Cheung et al. | |
| 9,813,015 B1 | 11/2017 | Kapla et al. | |
| 9,893,677 B1 * | 2/2018 | Liu | H02S 20/23 |
| 10,090,800 B2 | 10/2018 | McPheeters et al. | |
| 10,100,973 B2 | 10/2018 | Anderson | |
| 10,211,774 B2 | 2/2019 | Zhu | |
| 10,305,416 B2 | 5/2019 | Zhu | |
| 10,451,315 B2 | 10/2019 | Harris et al. | |
| 10,587,220 B2 | 3/2020 | De Vogel et al. | |
| 10,597,890 B2 | 3/2020 | Hill | |
| 10,622,935 B1 * | 4/2020 | Liu | H02S 30/00 |
| 10,801,538 B2 | 10/2020 | Legall et al. | |
| 10,871,026 B1 | 12/2020 | Mourchid | |
| 11,060,341 B1 | 7/2021 | Sprague | |
| 11,512,474 B2 * | 11/2022 | Haddock | F16B 2/065 |
| 11,638,985 B2 | 5/2023 | Brooks et al. | |
| 11,770,097 B1 * | 9/2023 | Jasmin | F16B 2/241 |
| | | | 248/229.12 |
| 2004/0037639 A1 | 2/2004 | Ledingham | |
| 2011/0284708 A1 | 11/2011 | McPheeters | |
| 2012/0201601 A1 | 8/2012 | Rizzo | |
| 2013/0102165 A1 | 4/2013 | DuPont | |
| 2013/0168340 A1 | 7/2013 | Urban | |
| 2015/0316086 A1 | 11/2015 | Urban et al. | |
| 2019/0178274 A1 | 6/2019 | Katz | |
| 2019/0219196 A1 | 7/2019 | Ripoll Agullo et al. | |
| 2020/0350857 A1 | 11/2020 | Schuit | |
| 2021/0010497 A1 * | 1/2021 | Geislinger | F16B 5/0642 |

FOREIGN PATENT DOCUMENTS

| | | |
|---|---|---|
| CN | 104653876 A | 5/2015 |
| CN | 104676123 A | 6/2015 |
| CN | 102359456 B | 7/2015 |
| DE | 102007051330 A1 | 5/2008 |
| DE | 102007036206 A1 | 2/2009 |
| DE | 102010029820 A1 | 7/2011 |
| DE | 102006015700 B4 | 7/2021 |
| DE | 102021104204 A1 | 9/2021 |
| GB | 248952 A | 3/1926 |
| NA | 202888200 U | 4/2013 |
| WO | 2022035755 A1 | 2/2022 |

OTHER PUBLICATIONS

Power Rail, Top-Clamping PV Mounting System P4, P6, P8, and P14 Rails, SL-SS-1086-4, Nov. 2016, Preformed Line Products Company., Cleveland, Ohio.

PV Solar Roof and Structure Mounting System, SL-ML-1034-12P, May 2020, Preformed Line Products Company, Cleveland, Ohio.

SnapNRack Universal End Clamp Drawing, Part No. 242-02215, Revision A, Jan. 2017, Sunrun South LLC, San Francisco, California.

Fastening & Grounding Clip for Framed Modules on Trackers or Ground Mount, PowAR Cinch Combined PV Fastening & Grounding Clip, Sep. 2021, ARaymond Energies SAS, Grenoble, France.

Cut Sheet 5031 ML Clamp, Doc. No. V110718, Nov. 2018, Ace Clamp by PMC Industries, Inc., Plainville, Connecticut.

Make Fence Post Repair EZ, Doc. No. F-C-EZFPP22, Dec. 2021, Simpson Strong-Tie Company, Inc., Pleasanton, California.

Yeti Clamp, Yeti Clamp Technical Sheet US02-1019, Oct. 2019, K2 Systems LLC, Oceanside, California, downloaded from the Internet from https://edison.com.mx/wp-content/uploads/2020/10/YetiClamp-Everest-Abrazadera-Oculta-Datasheet.pdf on Jun. 13, 2022.

Extended European Search Report for European Patent Application No. EP 23178532.0, dated Nov. 6, 2023, European Patent Office, Munich, Germany.

* cited by examiner

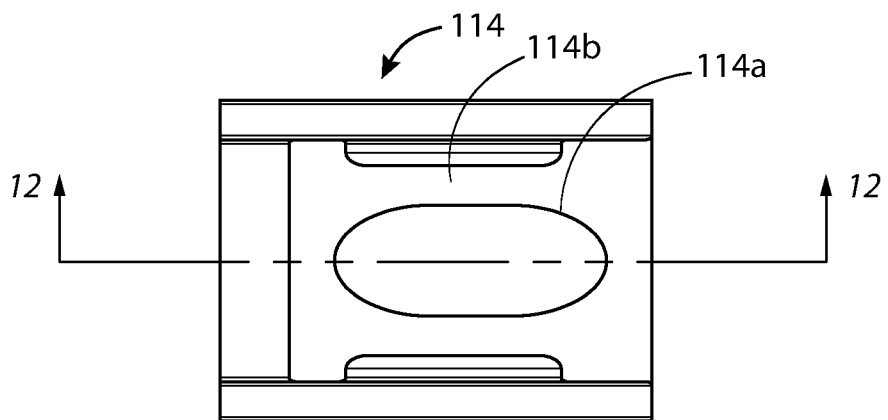
FIG. 11
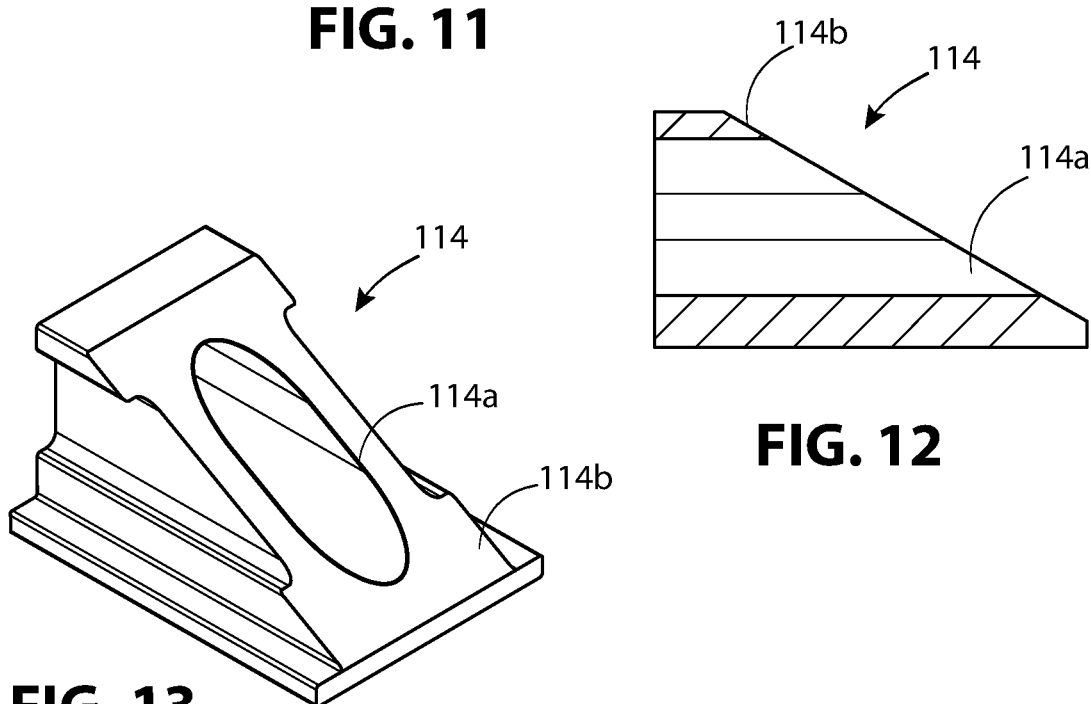
FIG. 12
FIG. 13
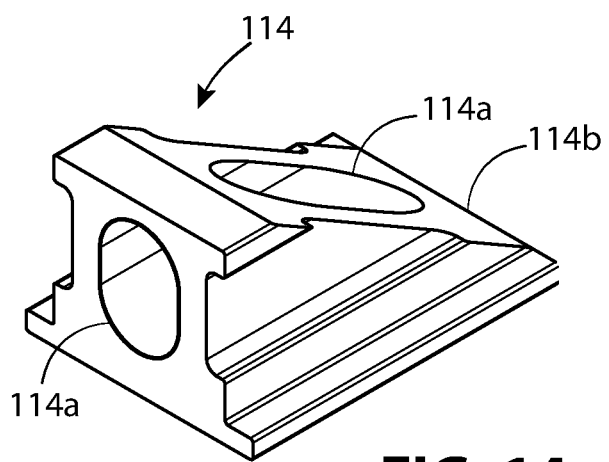
FIG. 14

DEVICE AND SYSTEM FOR MOUNTING SOLAR PANELS TO ROOFS AND THE LIKE

BACKGROUND

Solar panels, such as solar photovoltaic panels, are used in residential, commercial, industrial, and utility-scale applications. In residential and commercial applications, solar panels are typically mounted to roof structures such as pitched shingle roofs, tile roofs, metal roofs, or concrete roofs. For utility-scale and industrial applications, solar panels are often positioned over the ground using ground-mounted structures. Solar panels are typically arranged in rows and columns known as solar panel arrays. Solar panel arrays are commonly secured to rails that can span the length of one or more solar panels. The rails can be secured to roof or ground-mounted structures using various types of brackets.

Solar panels can be secured to rails using over-the-panel clamps and under-the-panel clamps. Over-the-panel clamps typically secure a solar panel to a rail by clamping downward on the top of the solar panel's frame. Over-the-panel clamps come in several styles. These include mid clamps and end clamps. Mid clamps are positioned between two adjacent solar panels. End clamps are positioned on the outside perimeter of the solar panel array.

Under-the-panel clamps typically secure the underside of the inward-facing lower lip, or return flange, of the solar panel frame to the rail. Under-the-panel clamps are also known as solar panel bottom clamps.

Solar panel racking systems (also known as solar panel mounting systems) can use a combination of over-the-panel clamps and solar panel bottom clamps. For example, a solar panel racking system can use over-the-panel mid clamps between solar panels and solar panel bottom clamps under the perimeter edges of the solar panel array.

SUMMARY

The inventor set out to improve solar panel bottom clamps. As a solar panel racking system designer, he set out to make it easier for the system installers to install and repair solar panel racking systems. He observed that many solar panel bottom clamps require hand tools to install and are not easy to access. He also observed that solar panel bottom clamps that are easy to access are often complex and expensive to fabricate. To the inventor's knowledge, commercially available solar panel bottom clamps are only compatible with slotted rails.

The inventor developed a solar panel bottom clamp that can work with both slotted and slotless rails, can be installed with either hand tools or power tools, is easy to access, simple in design, and relatively inexpensive to manufacture.

The device includes a clamp body and a clamping mechanism that resides at least partially within the clamp body. The clamp body can include a bottom and a pair of sides extending upward from the bottom. The pair of sides includes a corresponding pair of slot-shaped openings. The slot-shaped openings are open on one end, parallel to each other, and extend widthwise along the sides of the clamp body. The clamping mechanism is disposed to selectively narrow the distance between the pair of slot-shaped openings and the top surface of the clamping mechanism.

Expanding upon the principle described above, the clamp body and the slot-shaped openings are sized, shaped, and positioned to receive a rail between the pair slot-shaped openings and the clamping mechanism. The slot-shaped openings are sized and shaped to receive the return flange of the solar panel. As the clamping mechanism is adjusted upward, it presses the rail and the return flange against the upper edge of the slot-shaped openings, securing the solar panel to the rail.

The clamping mechanism can include a threaded fastener. The threaded fastener can engage a movable member that is also threaded and cause the movable member to move up and down, i.e., toward, or away from the slot-shaped openings. The clamping mechanism can alternatively include a threaded fastener, a stationary member, and a movable member. The threaded fastener passes through the stationary member and engages the movable member, which causes the movable member to move up or down, toward, or away from the pair of slot-shaped openings. With the rail received by the clamp body and the return flanges received by the slot-shaped openings as described above, turning the threaded fastener can cause the movable member to move upward, pressing the rail against the return flange and the return flange against the top of the slot-shaped openings.

The inventor built and tested an example, using principles described above, where a threaded fastener engages an unthreaded first wedge and threadedly engages a second wedge. The first wedge is held stationary to the clamp body. As the threaded fastener is turned, depending on the direction, the second wedge is drawn inward and moves upward along the first wedge, or is drawn outward and moves downward along the first wedge. As the threaded fastener moves up the first wedge, it narrows the distance between the top of the clamping mechanism (i.e., top of the second wedge) and the slot-shaped openings. When the rail and return flange are received by the clamp body, as previously described, drawing the second wedge upward along the first wedge presses the rail against the return flange and the return flange against the top of the slot-shaped openings. In this example, the threaded fastener can be adjusted using power tools or hand tools from the edge of the solar panel array. The first wedge, second wedge, and clamp body can be extruded for economy. They can alternatively be cast, molded, 3D printed, or stamped and formed.

The inventor envisions the principles described in this disclosure can be applied to other devices for mounting solar panel return flanges to rails. In one example, the clamping mechanism could include a threaded fastener, a threaded stationary nut, and a lever arm. In another example, the inventor envisions the clamping mechanism could include a threaded fastener, a threaded movable nut, and a compressible member. For example, the compressible member can be a cone-shaped object or a compressible wedge. In yet another example, the inventor envisions the clamping mechanism as a threaded fastener whose body passes into a threaded aperture in the bottom of the clamp body.

In addition, it is the inventor's intent that his concept can encompass a system that includes the solar panels, rails, mounting brackets, as well as the solar panel bottom clamps discussed above. In addition, he envisions this system be applied to residential, commercial, industrial, and utility-scale applications including roof-mounted and ground-mounted systems.

These examples and the above-mentioned advantages are representative and are not meant to limit the inventive concept to the examples given or the discussed advantages. This summary is not exhaustive. Additional features and advantages will be apparent from the Detailed Description, drawings, and claims.

BRIEF DESCRIPTION OF DRAWINGS

FIG. 11 illustrates, in top plan view, the first wedge of the solar panel bottom clamp of FIG. 9.

FIG. 12 illustrates a section view of the first wedge taken along section lines 12-12 of FIG. 11.

FIG. 13 illustrates, in front right orthographic view, the first wedge of FIG. 9.

FIG. 14 illustrates, in front left orthographic view, the first wedge of FIG. 9.

DETAILED DESCRIPTION

When describing the figures, the terms "top," "bottom," "front," and "side," are from the perspective of a person standing in front of a solar panel assembly. Specific dimensions are intended to help the reader understand the scale of the disclosed material. Dimensions given are typical and the claims are not limited to the recited dimensions. Ordinals such as "first," "second," or "third," are used in this Detailed Description and in the Claims to differentiate between similarly-named parts and do not imply a particular order, preference, or importance. "Optional" or "optionally" is used throughout this disclosure to describe features or structures that are optional. Not using the word "optional" or "optionally" to describe a feature or structure does not imply that the feature or structure is not optional. Finally, the word "or" is used in the ordinary sense to mean an "inclusive or," unless preceded by a qualifier, such as the word "either," that signals an "exclusive or."

Definitions

The following terms are used throughout this disclosure and are defined here for clarity and convenience.

Solar Panel Bottom Clamp: As defined in this disclosure, a solar panel bottom clamp is a device that secures the return flange of a solar panel frame to a solar panel mounting device. The solar panel mounting device is typically a rail.

Return Flange: As defined in this disclosure, a return flange is the lower lip portion of a solar panel frame that projects inward underneath the solar panel.

System Overview

Figure 1:
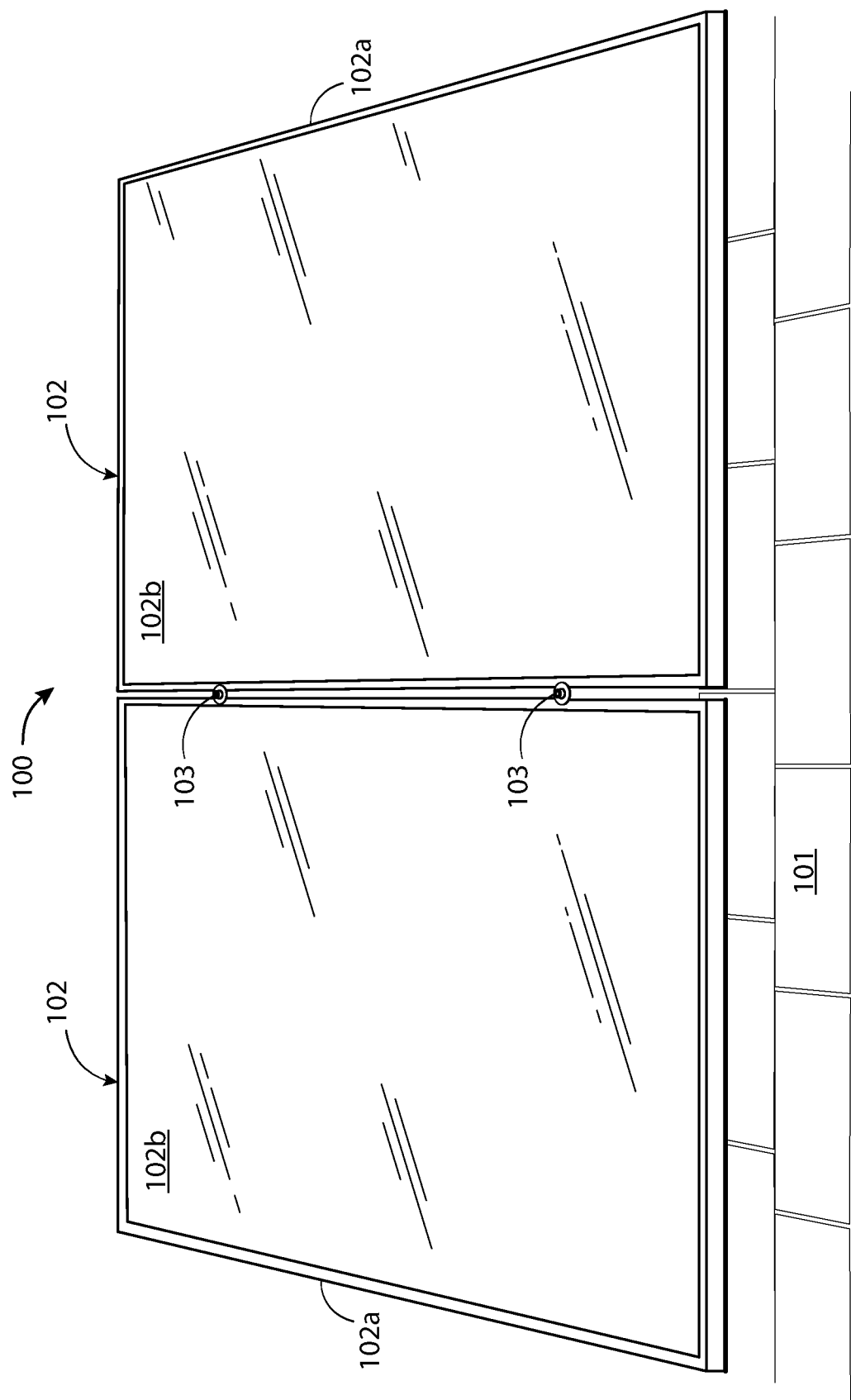
FIG. 1 illustrates, in front perspective view, a solar panel assembly mounted to a roof.

FIG. 1 illustrates a portion of a solar panel assembly 100 mounted to a roof 101 as typically viewed by an observer from the ground. In this illustration, the portion of the solar panel assembly 100 visible from the ground, includes two instances of solar panel 102 and two instances of mid clamp 103. The visible portion of each instance of the solar panel 102 illustrated, includes frame 102a surrounding a solar cell assembly 102b.

Figure 2:
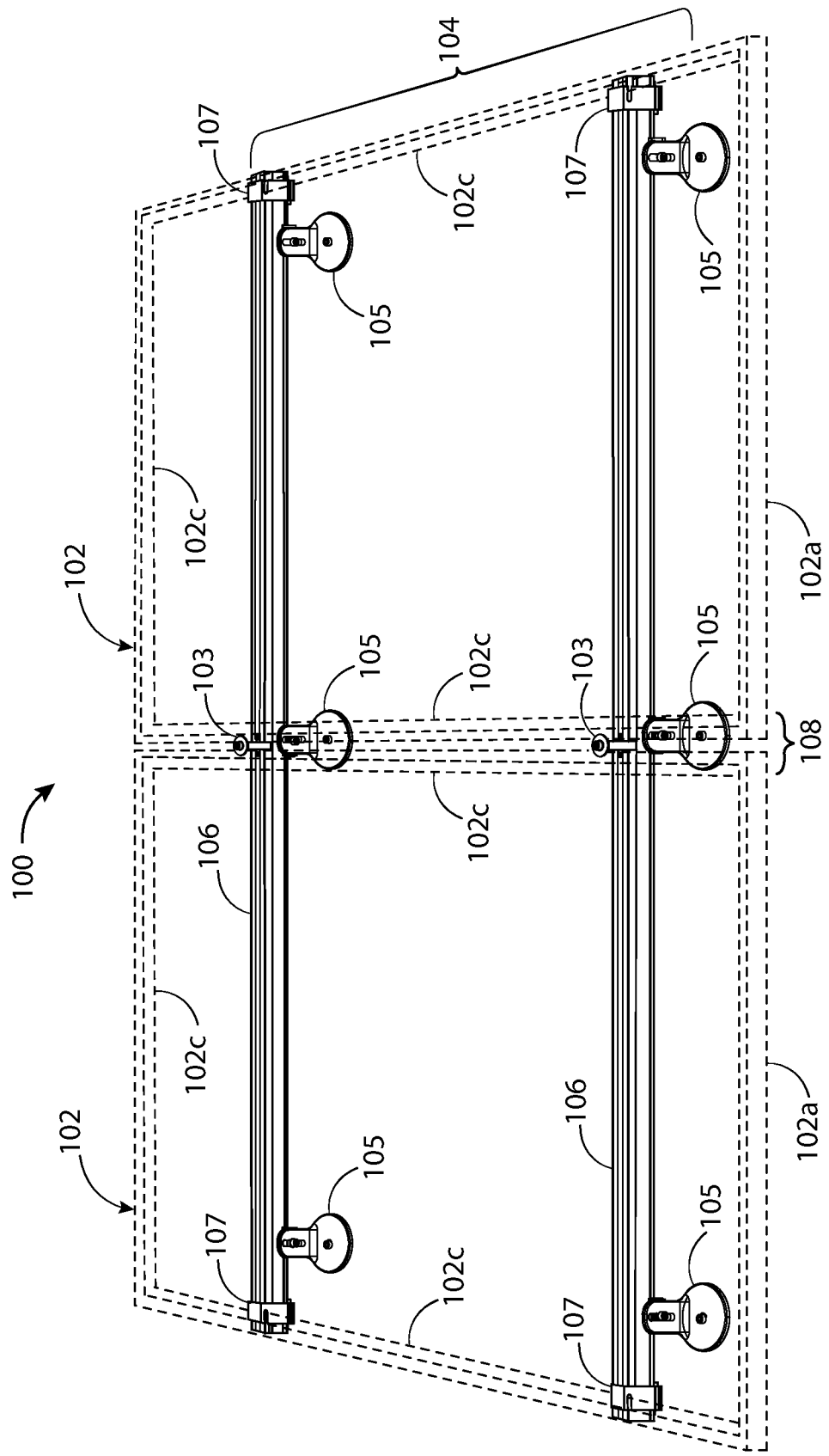
FIG. 2 illustrates, in front perspective view, the solar panel assembly of FIG. 1 with the solar panels shown in outline to reveal the underlying solar panel racking system.

FIG. 2 illustrates the solar panel assembly 100 of FIG. 1 with the two instances of solar panel 102 shown in outline, via dashed lines, to reveal a solar panel racking system 104. The frame 102a of each instance of the solar panel 102 includes return flange 102c. The return flange positioned in the front portion of each instance of solar panel 102 is hidden from view.

The solar panel racking system 104, as illustrated, includes two instances of mid clamp 103, six instances of roof bracket 105, two instances of rail 106, and four instances of solar panel bottom clamp 107. The solar panel assembly 100 is simplified for illustration. Typically, residential, commercial, industrial, or utility-scale solar arrays, include many more solar panels. For example, a 20 kW residential array using 480 W solar panels could require an array size of forty-two solar panels. A 1000 kW commercial system could include as many as 2000 solar panels. Such a commercial system would require hundreds of the mid clamp 103, roof bracket 105, rail 106, and solar panel bottom clamp 107.

General Concepts

The solar panel racking system 104, as illustrated in FIG. 2, includes solar panel bottom clamp 107 mounted on the outside perimeter of the solar panel array 108 of solar panel assembly 100. Solar panel bottom clamp 107, as built by the Applicant, will be described in FIGS. 3-10 with associated components discussed in FIGS. 11-18. Prophetic examples of solar panel bottom clamps are illustrated in FIGS. 19-28.

This General Concepts section describes general principles. For simplicity, these general principles are discussed in terms of FIGS. 3-10, but can be applied to the other figures and examples in the disclosure.

Figure 4:
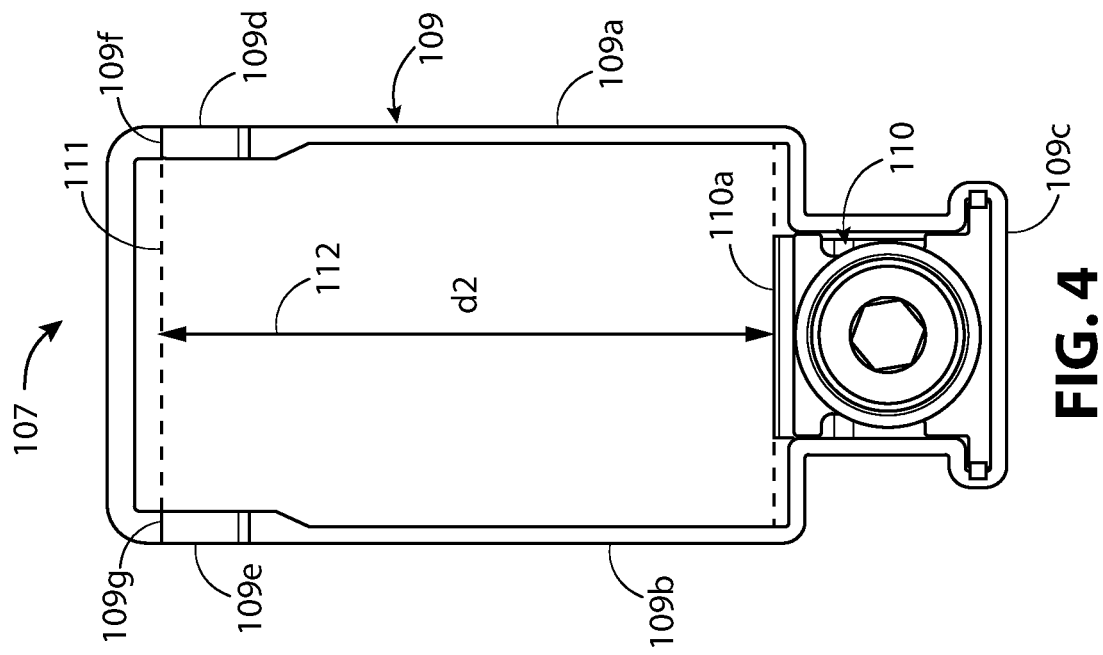
FIG. 4 illustrates, in side elevation view, the solar panel bottom clamp of FIG. 3 where the clamping mechanism is adjusted so the distance between the top of the clamping mechanism and the slot-shaped openings is narrower than FIG. 3.
Figure 3:
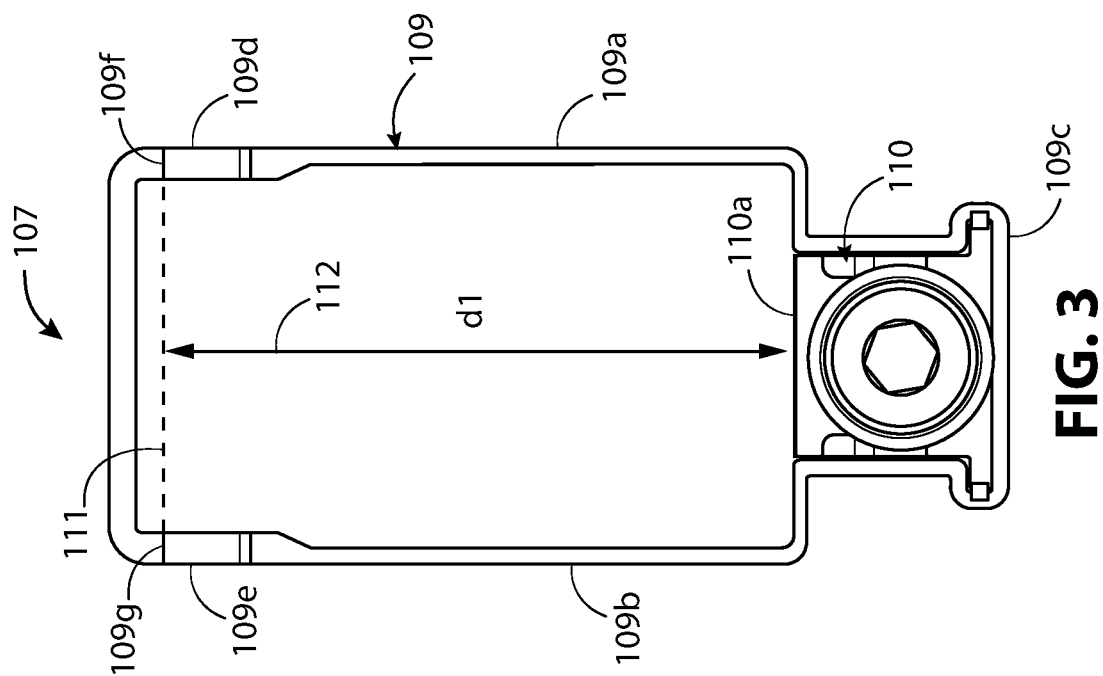
FIG. 3 illustrates, in side elevation view, the solar panel bottom clamp of FIG. 2

FIGS. 3 and 4 show, in side view, the solar panel bottom clamp 107 of FIG. 2. The solar panel bottom clamp 107 includes a clamp body 109 and a clamping mechanism 110. The clamping mechanism 110 can be positioned at least partially within the clamp body 109. For example, in FIG. 5, a portion of the clamping mechanism 110 is illustrated as extending beyond the clamp body 109.

Figure 9:
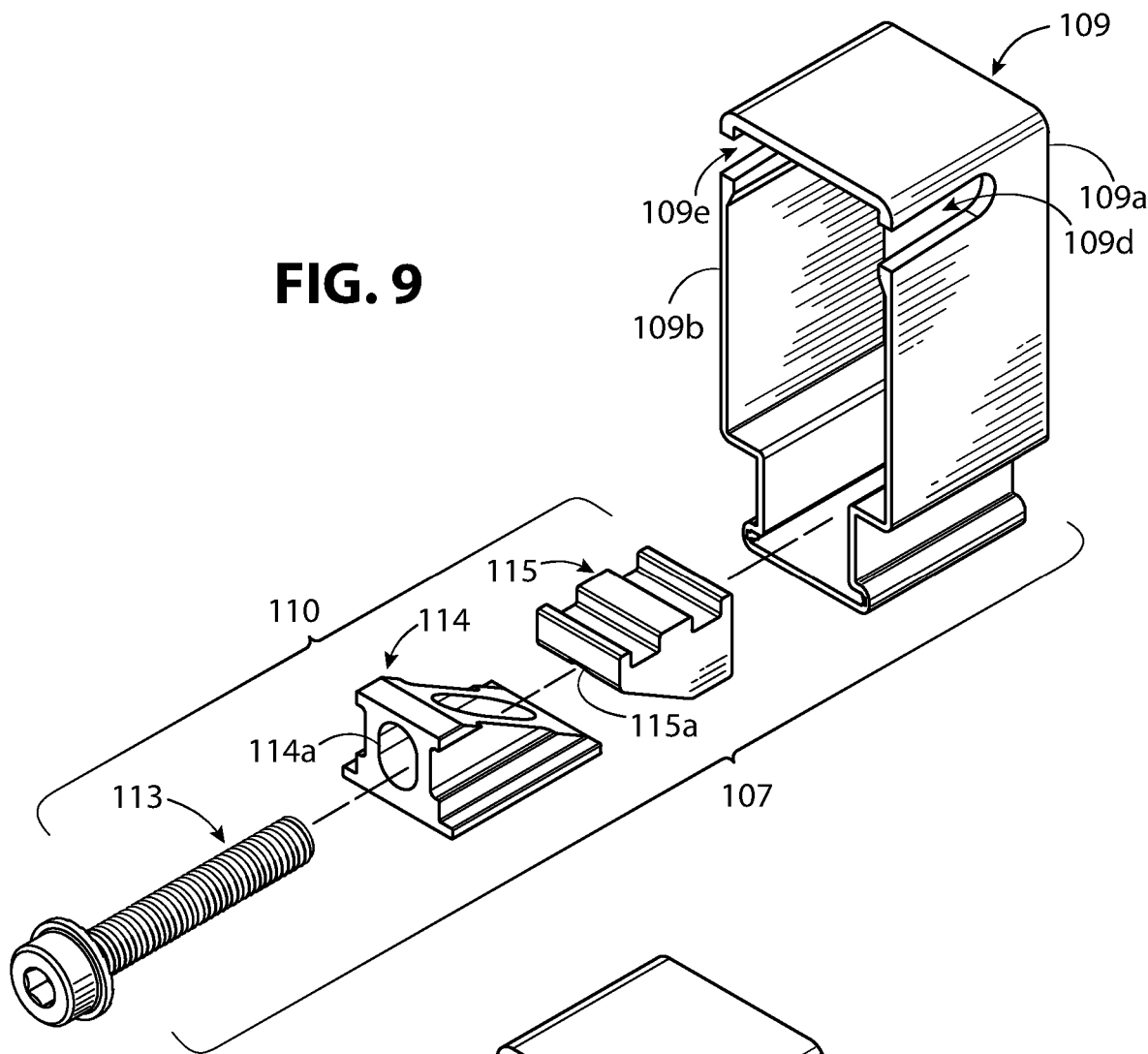
FIG. 9 illustrates, in front and top exploded orthographic view, the solar panel bottom clamp of FIG. 3.
Figure 10:
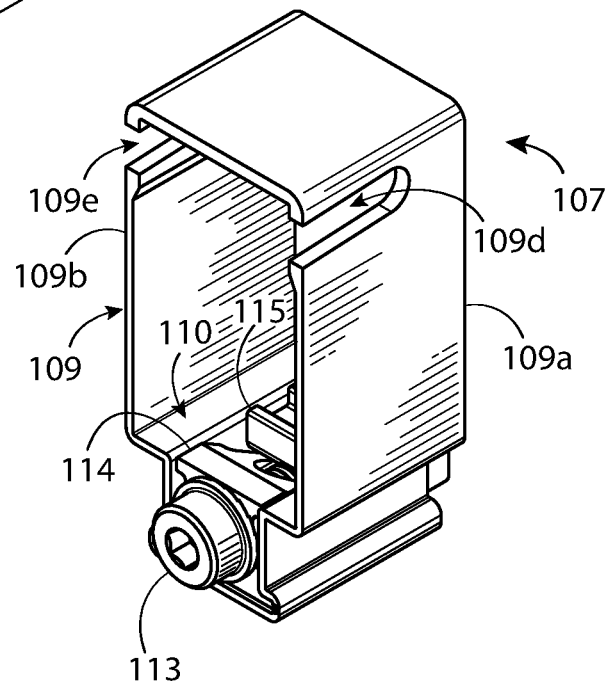
FIG. 10 illustrates, in front and top orthographic view, the solar panel bottom clamp of FIG. 9.
Figure 15:
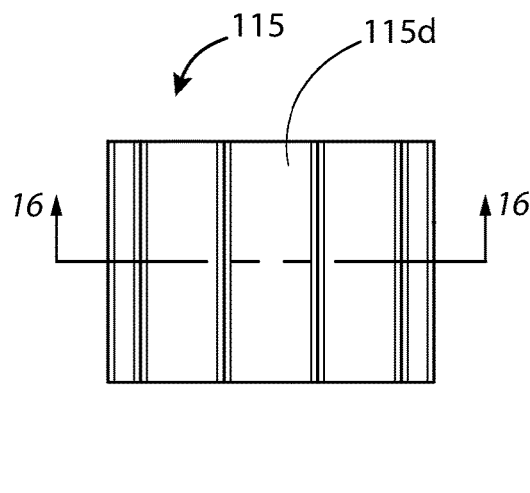
FIG. 15 illustrates, in top plan view, the second wedge of FIG. 9.

In FIGS. 3 and 4, the clamp body 109 includes a bottom and a pair of sides extending upward from the bottom. First side 109a and second side 109b extend upward from bottom 109c. The pair of sides includes a corresponding pair of slot-shaped openings. First side 109a includes first slot-shaped opening 109d and second side 109b includes second slot-shaped opening 109e. The slot-shaped opening can be parallel to each other. The first slot-shaped opening 109d is illustrated as open on one end and extending widthwise (i.e., along the width) into the first side 109a. The second slot-shaped opening 109e is illustrated as open on one end and extending widthwise into the second side 109b. FIGS. 9 and 10 also illustrate the first slot-shaped opening 109d extending widthwise into the first side 109a and the second slot-shaped opening 109e extending widthwise into the second side 109b.

Referring to FIGS. 3 and 4, a construction line 111 between the upper edge 109f of first slot-shaped opening 109d and the upper edge 109g of second slot-shaped opening 109e illustrates that they are positioned parallel to each other on first side 109a and second side 109b, respectively. The construction line 111 is perpendicular to first side 109a and second side 109b. The clamping mechanism 110 is shown disposed to selectively narrow the distance 112 between a top portion 110a of the clamping mechanism 110 and the pair of slot-shaped openings. In FIG. 3, for example, the distance 112 between the clamping mechanism 110 and the pair of slot-shaped openings is represented as a distance d1. In FIG. 4, selectively engaging the clamping mechanism 110 narrows this to a distance d2. Distance 112 is illustrated to represent the distance between the top portion 110a of the clamping mechanism 110 and construction line 111, which passes through the upper edges of the pair of slot-shaped openings.

Figure 5:
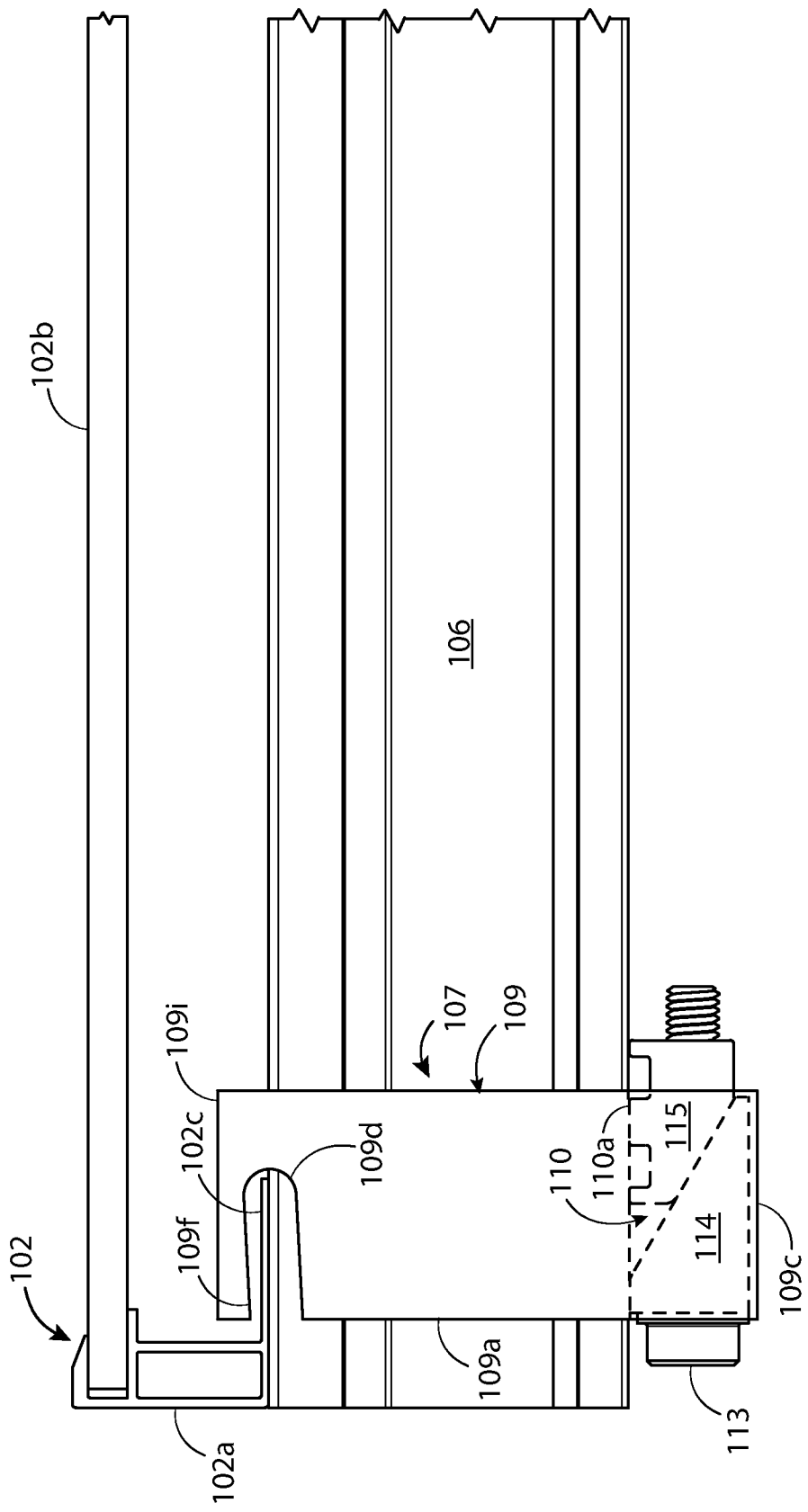
FIG. 5 illustrates, in front elevation view, the solar panel bottom clamp, and a portion of the rail and solar panel of FIG. 2, where the solar panel is unclamped to the rail.
Figure 6:
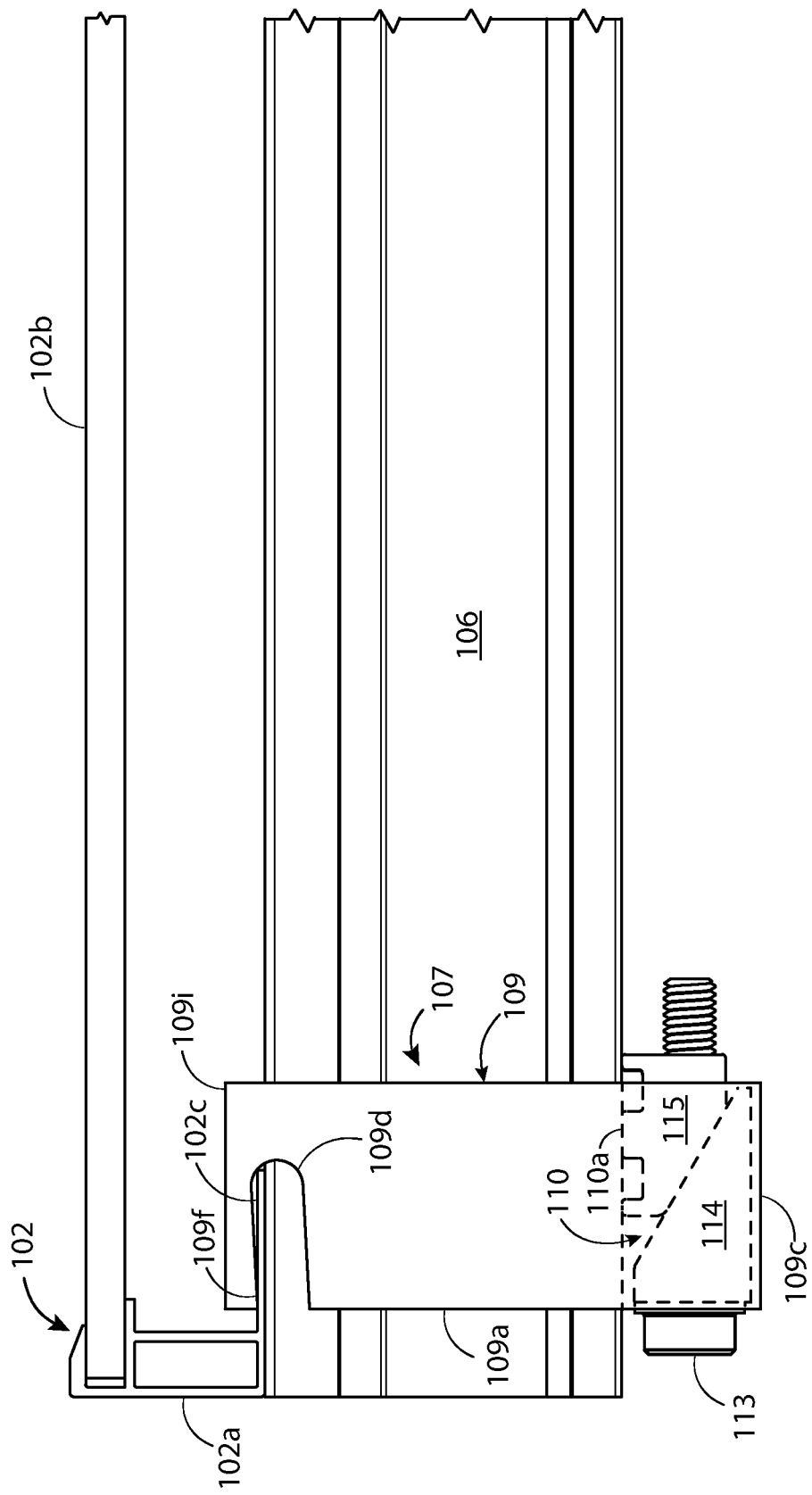
FIG. 6 illustrates, in front elevation view, the solar panel bottom clamp, and a portion of the rail and solar panel of FIG. 2, where the solar panel is clamped to the rail.
Figure 7:
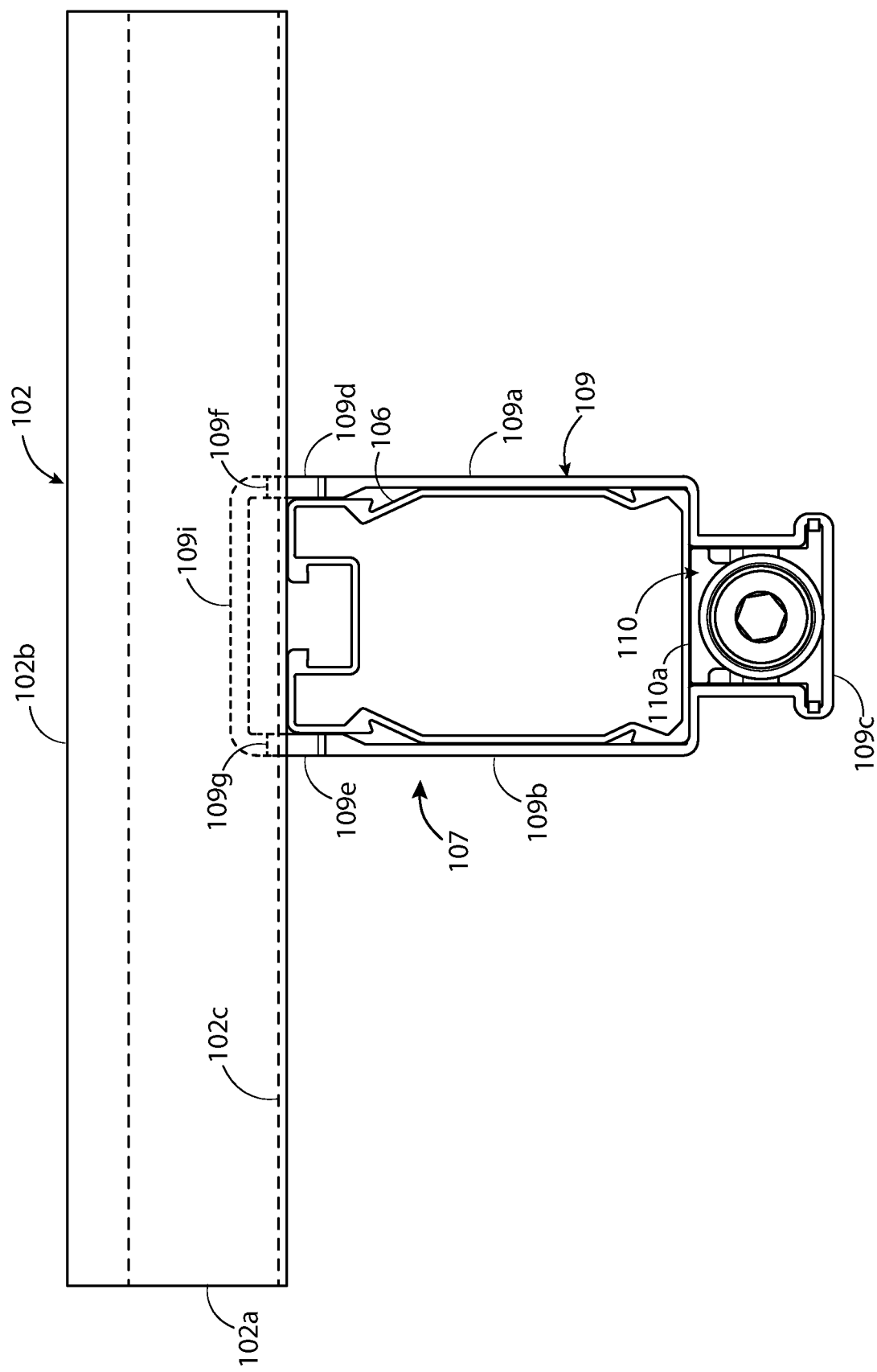
FIG. 7 illustrates, in side elevation view, the solar panel bottom clamp, rail, and solar panel of FIG. 5.
Figure 8:
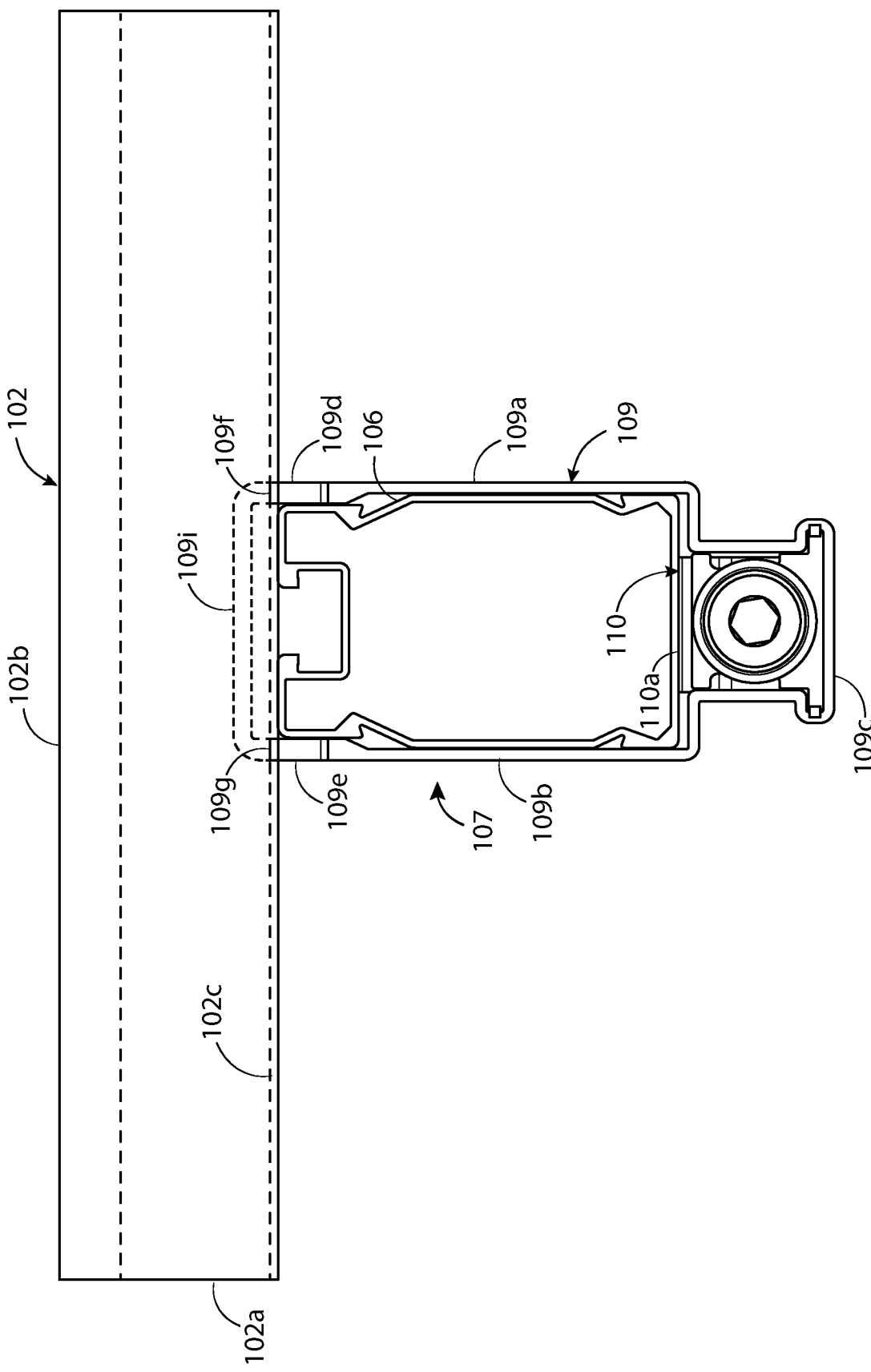
FIG. 8 illustrates, in side elevation view, the solar panel bottom clamp, rail and solar panel of FIG. 6.

The pair of slot-shaped openings, being open on one end, allows them to receive a planar surface that is wider than the width of the clamp body 109, for example, the return flange 102c of FIG. 2. Referring to FIGS. the pair of slot-shaped openings, first slot-shaped opening 109d (FIGS. and second slot-shaped opening 109e (FIGS. 7 and 8) receives the return flange 102c (FIGS. 5-8). In FIGS. 7 and 8, the solar cell assembly 102b, the return flange 102c, and the upper portion of the clamp body 109 that is positioned behind the frame 102a of the solar panel 102, is represented by dashed lines. In FIGS. 5 and 6, the front of the solar panel 102 is cutaway to reveal the frame 102a, the solar cell assembly 102b, and the return flange 102c. The clamping mechanism 110 is hidden behind the first side 109a and illustrated in dashed lines.

Referring to FIGS. 5-8, the clamp body 109 is sized and shaped to receive the rail 106 between the pair of slot-shaped openings and the top portion 110a and enclose the rail 106 between the bottom 109c, the pair of sides, and optionally the top 109i.

In FIGS. 5 and 7, the clamping mechanism 110 is selectively engaged (i.e., adjusted) to widen the distance between the top portion 110a of the clamping mechanism 110 and the pair of slot-shaped openings. This creates a gap between the upper edges of the pair of slot-shaped openings, upper edge 109f (FIGS. 5 and 7) and upper edge 109g (FIG. 7), and the top of the rail 106, and allows the return flange 102c and the rail 106 to move relative to one another.

In FIGS. 6 and 8, the clamping mechanism is adjusted to narrow the distance and close the gap between the top portion 110a of the clamping mechanism 110 and the pair of slot-shaped openings. The clamping mechanism 110 presses upward against rail 106. The rail 106 and the return flange 102c together are pressed against the upper edge 109f (FIGS. 6 and 8) and upper edge 109g (FIG. 8) of the pair of slot-shaped openings. This clamps the rail 106 and the return flange 102c to each other, clamping the solar panel 102 to the rail 106.

In general, the clamping mechanism can include a movable member. It can alternatively include a threaded fastener and a movable member. It can include a threaded fastener, a stationary member, and a movable member. In the last instance, the threaded fastener can either threadedly engage the stationary member and non-threadedly engage the movable member or the threaded fastener can threadedly engage the movable member and non-threadedly engage the stationary member. In the variations described in this paragraph, the movable member, through selective engagement, narrows the distance between the pair of slot-shaped openings and the top surface of the movable member. Examples of each will be discussed later in this Detailed Description.

Applying at least some of the concepts discussed in this section, a solar panel bottom clamp can be constructed inexpensively and with few components. These components can be extruded for cost and strength. Alternatively, the can be stamped and formed, cast, or 3D printed. The components can be made from aluminum, steel, plastic, or any material with sufficient strength to clamp and support a solar panel to a roof or ground-mount structure and capable of withstanding the environmental conditions typical of solar panel racking systems.

The inventor envisions that the principles discussed in this section can be applied to a wide range of solar panel bottom clamps, examples of which, are discussed below.

Example 1

Now we will discuss the particular implementation of the solar panel bottom clamp 107 illustrated in FIGS. 3-10 as well as discussion of associated components in FIGS. 11-18.

Referring to FIGS. 9 and 10, the solar panel bottom clamp illustrated includes the clamp body 109 and the clamping mechanism 110. The clamp body 109 is shown with slot-shaped openings, first slot-shaped opening 109d and second slot-shaped opening 109e, open on one end, and extending widthwise into corresponding pair of sides, first side 109a and second side 109b, respectively, as previously described. The clamping mechanism 110 includes a stationary member, a movable member, and a threaded fastener 113. A first wedge 114 is held stationary within the clamp body 109, and a second wedge 115 is made movable up along the first wedge 114 by threaded engagement with the threaded fastener 113. Referring to FIGS. 3 and 4, this causes the distance 112 between the pair of slot-shaped openings and the top portion 110a of the clamping mechanism 110 to narrow.

Referring to FIGS. 5 and 6, the second wedge 115, made movable along the first wedge 114 by threaded engagement with the threaded fastener 113, presses the rail 106 upward against the return flange 102c. The first wedge 114 is held stationary within the clamp body 109, for example, by crimping, swaging, welding, adhesives, threaded fasteners, or integrally forming the first wedge 114 with the clamp body 109. The inventor envisions the first wedge 114 can be held stationary within the clamp body 109 by any suitable way of attachment that can withstand the typical day-to-day operations and environmental conditions of a solar panel racking system.

Referring to FIGS. 11-14, the first wedge 114 includes a through-aperture 114a. The through-aperture 114a can be unthreaded and elongated. This allows the threaded fastener 113 (see FIGS. 9 and 10) to pass through the first wedge freely and change the angle of engagement with the first wedge 114 as the second wedge moves up and down along the first wedge top surface 114b.

Figure 16:
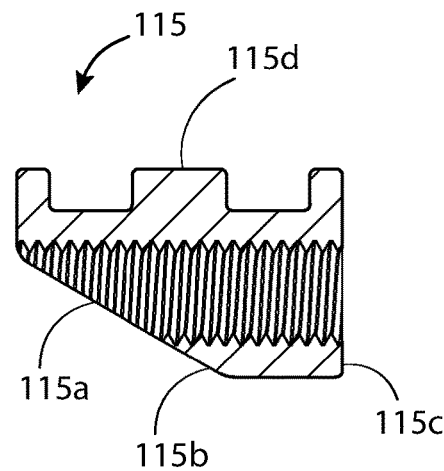
FIG. 16 illustrates a section view of the second wedge taken along section lines 16-16 of FIG. 15.
Figure 17:
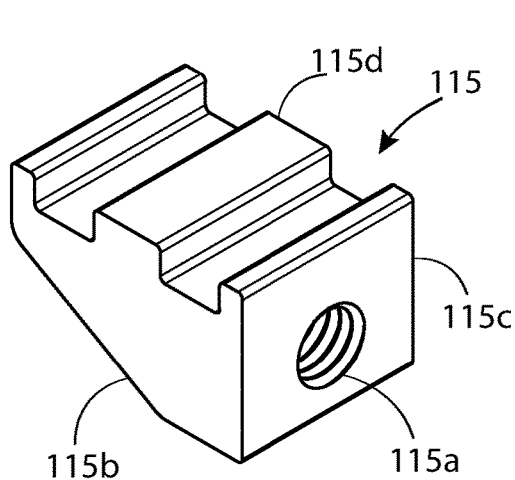
FIG. 17 illustrates, in front right orthographic view, the second wedge of FIG. 9.
Figure 18:
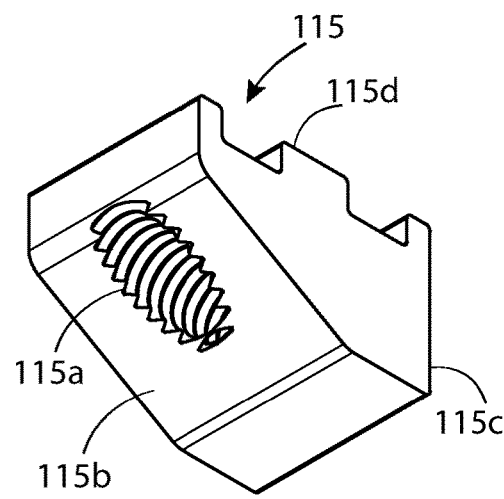
FIG. 18 illustrates, in front left orthographic view, the second wedge of FIG. 9.

Referring to FIGS. 16-18, the second wedge 115 includes a threaded aperture 115a that passes through the first side surface 115b and the second side surface 115c of the second wedge 115. Referring to FIGS. the top surface 115d of the second wedge 115 is shown as slotted, however, it can also be flat or planar.

Referring to FIG. 9, the first wedge 114 and the second wedge 115 are positioned between the pair of sides, first side 109a and second side 109b. Through-aperture 114a and threaded aperture 115a are likewise positioned between the pair of sides. The threaded fastener 113 engages the stationary member (i.e., the first wedge 114) and the movable member (i.e., the second wedge 115) between the pair of sides and widthwise along the pair of sides.

Example 2

Figure 19:
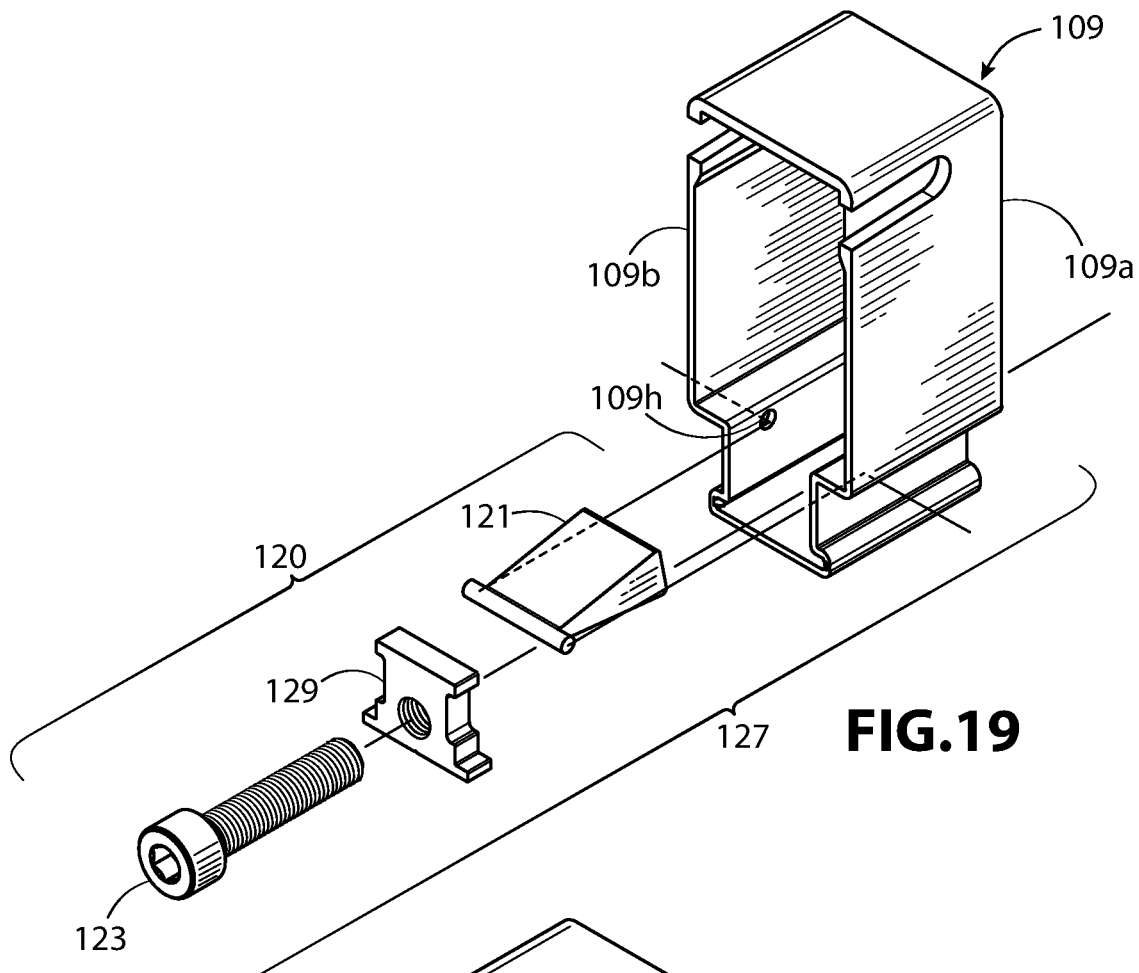
FIG. 19 illustrates, in front left orthographic and exploded view, an alternative example of a solar panel bottom clamp.
Figure 20:
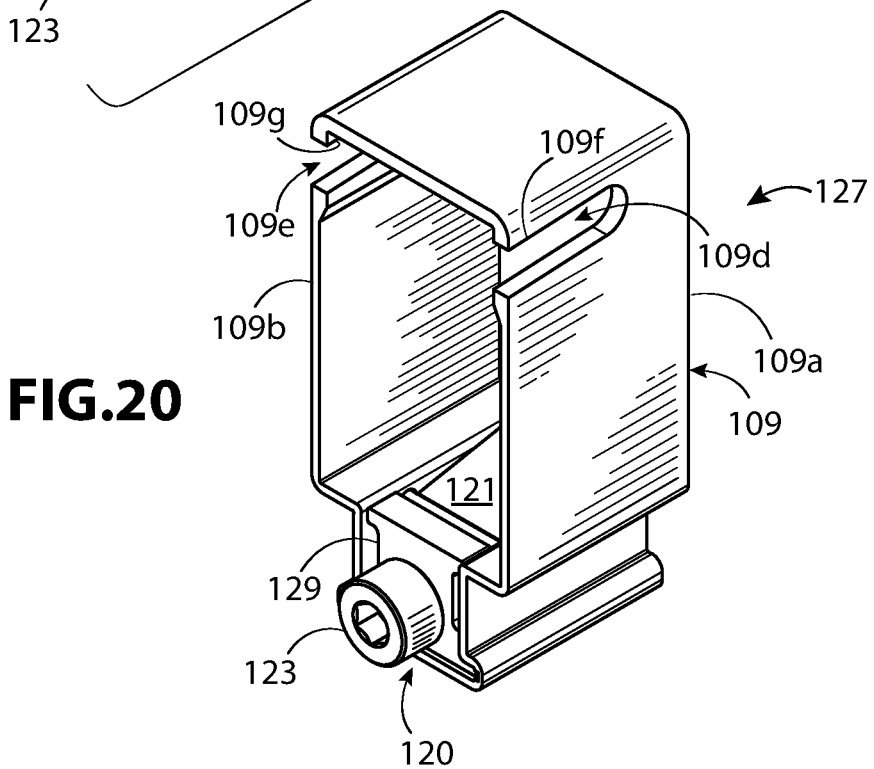
FIG. 20 illustrates, in front left orthographic view, the solar panel bottom clamp of FIG. 19.
Figure 21:
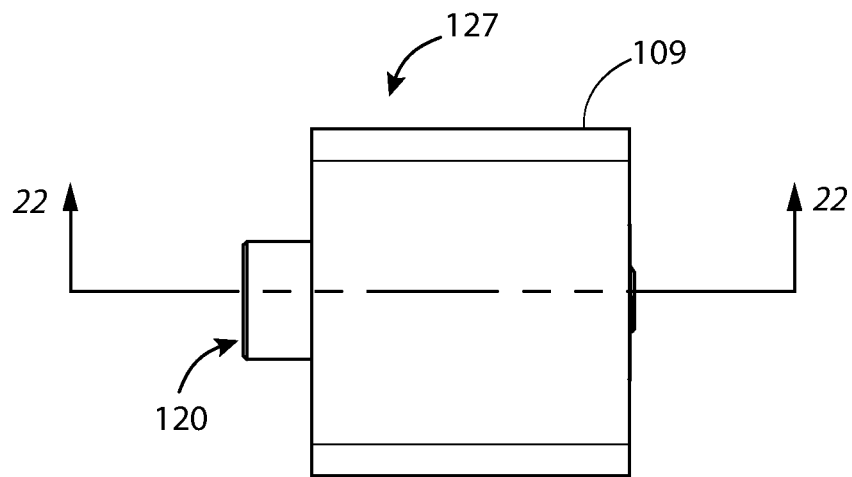
FIG. 21 illustrates, in top plan view, the solar panel bottom clamp of FIG. 20.
Figure 22:
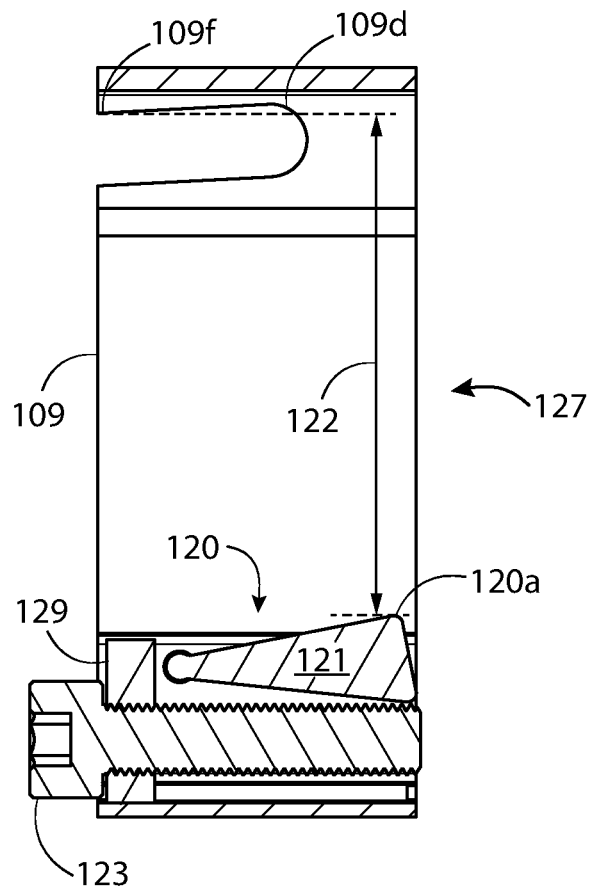
FIG. 22 illustrates a section view of the solar panel bottom clamp taken along section lines 22-22 in FIG. 21.

FIGS. 19-22 illustrate an example of a solar panel bottom clamp 127 that utilizes the clamp body 109 and the clamping mechanism 120. Referring to FIGS. 19, 20, and 22, the clamping mechanism 120 includes a threaded fastener 123 that threadedly engages a stationary member, i.e., stationary nut 129, and a movable member, i.e., lever arm 121. Referring to FIG. 20, the clamping mechanism 120 is at least partially positioned within the clamp body 109 between the first side 109a and the second side 109b. Referring to FIGS. 19, 20, and 22, lever arm 121 pivotally engages the clamp body 109 through apertures in the sides of the clamp body 109. Referring to FIG. 19, the first aperture within first side 109a is hidden from view, while the second aperture 109h is shown in second side 109b.

Referring to FIGS. 19 and 20, the stationary nut 129 is secured to the clamp body 109. The clamp body 109 and the stationary nut 129 can have complementary flanging, as illustrated, to create a tongue and groove. The stationary nut 129 can be secured to the clamp body 109 by crimping, swaging, welding, adhesive, or secured by one or more threaded fasteners. Alternatively, the stationary nut 129 could be eliminated by integrally forming a lower wall in the clamp body 109, in place of the stationary nut 129. In this case, with the stationary member eliminated, the clamping mechanism 120 would include the threaded fastener 123 and a movable member, i.e., the lever arm 121.

Referring to FIG. 22, the threaded fastener 123 threadedly engages the stationary nut 129. As the threaded fastener 123 moves inward through the stationary nut 129, it presses against the lever arm 121, which is wedge shaped, and pushes the lever arm 121 upward. This narrows the distance 122 between the top portion 120a of the clamping mechanism 120 (i.e., the top portion of the lever arm 121), and the upper edges of the pair of slot-shaped openings. FIG. 22 shows the upper edge 109f of the first slot-shaped opening 109d. For upper edge 109f of slot shaped opening 109d and the upper edge 109g of slot-shaped opening 109e in relation to the lever arm 121, see FIG. 20.

Example 3

Figure 23:
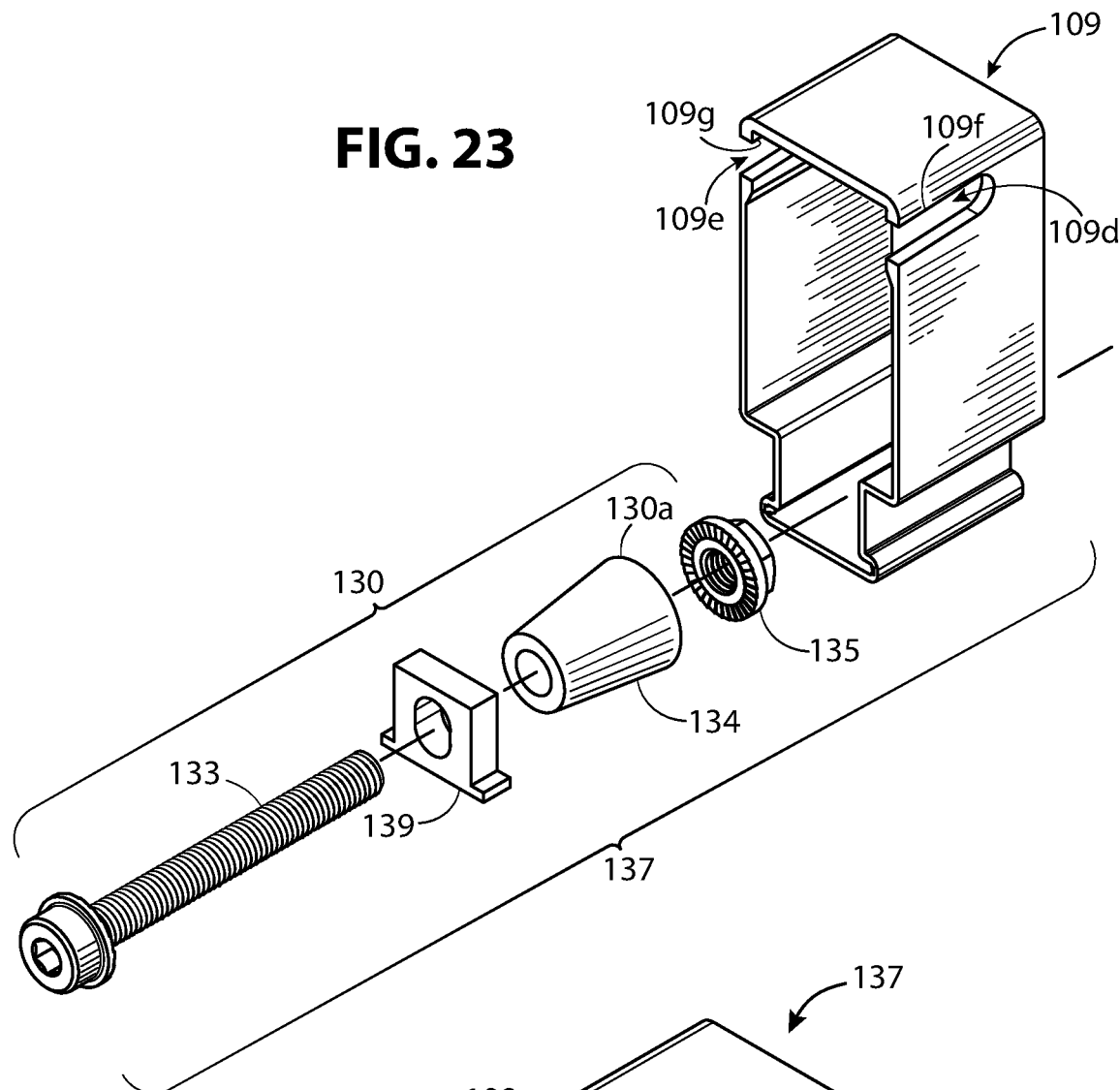
FIG. 23 illustrates, in front left orthographic and exploded view, an alternative example of a solar panel bottom clamp.
Figure 24:
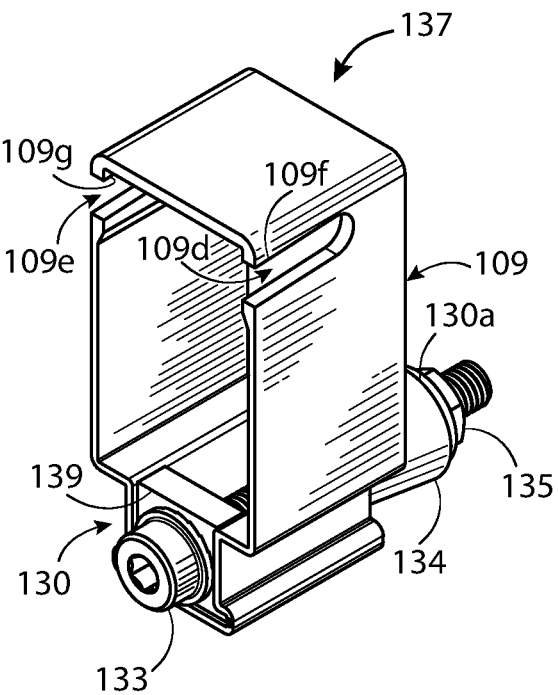
FIG. 24 illustrates, in front left orthographic view, the solar panel bottom clamp of FIG. 23.

FIGS. 23 and 24 illustrate another example of a solar panel bottom clamp 137 with clamping mechanism 130 and clamp body 109. The clamping mechanism 130 includes a threaded fastener 133, a stationary member, i.e., stationary nut 139, a movable member, i.e., compressible member 134, and a threaded retainer 135. The stationary nut 139 can be secured to the clamp body 109 as described for examples 1 and 2. The threaded retainer here is shown as a threaded nut, but can be other types of threaded retainers capable of compressing the compressible member 134. The compressible member 134 is illustrated as a cone, but can also be a wedge, or other shapes that are wider on one end than the other. As the compressible member 134 is compressed, the taller end is drawn into the clamp body 109. This shortens the distance between the top surface 130a of the clamping mechanism 130 (i.e., the top of the compressible member 134) and the upper edges of the slot-shaped openings. As illustrated, this is upper edge 109f and upper edge 109g of the first slot-shaped opening 109d and the second slot-shaped opening 109e, respectively. With the rail received by the clamp body 109 and the return flange received by the pair of slot-shaped openings, as previously discussed, drawing the taller end of the compressible member 134 into the clamp body 109 would press the rail against the return flange and secure the solar panel to the rail.

The compressible member 134 is typically made from ethylene propylene diene monomer rubber (i.e., EPDM), natural rubber, or a synthetic rubber such as polychloroprene (i.e., neoprene). The compressible member 134 can be made from any compressible material that can withstand the environmental conditions typical of a solar panel installation and has sufficient resistance to deflection under the load of the solar panel, to clamp the solar panel in place.

Example 4

Figure 26:
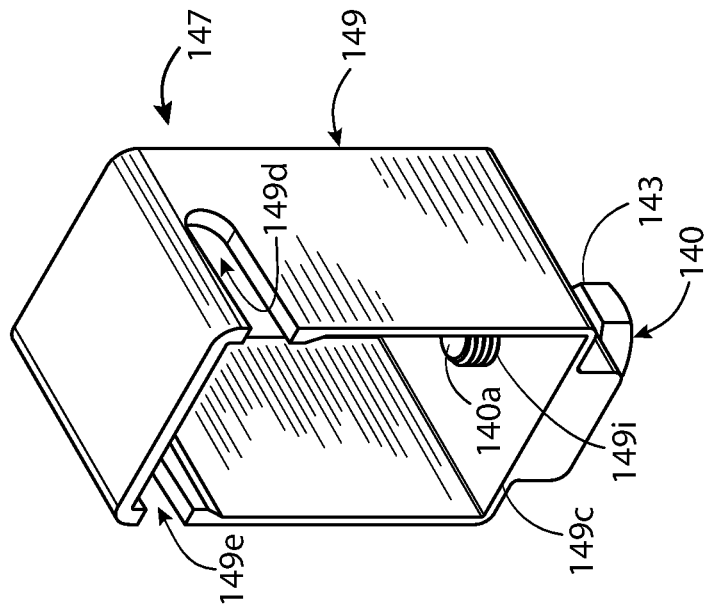
FIG. 26 illustrates, in front left orthographic view, the solar panel bottom clamp of FIG. 25.
Figure 25:
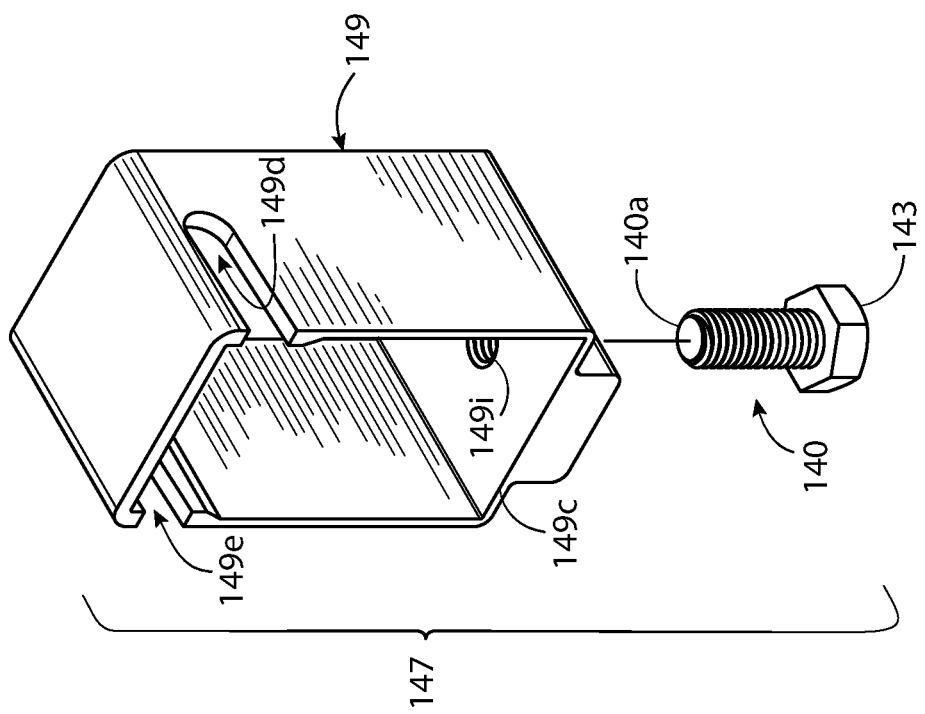
FIG. 25 illustrates, in front left orthographic and exploded view, an alternative example of a solar panel bottom clamp.

In the previous examples, the threaded fastener was positioned horizontally with the head of the fastener facing away from the solar panel array. This allows the solar panel bottom clamp to be easily adjusted using a power tool. There may be instances where it is desirable to adjust the solar panel bottom clamp from below. An example of this, could be a ground-mounted solar panel array where the installer has access vertically from below rather than horizontally from the sides. FIGS. 25 and 26 illustrate an example where the solar panel bottom clamp 147 that can be adjusted from below. The solar panel bottom clamp 147 includes clamp body 149 and a clamping mechanism 140. Here the clamping mechanism 140 is a threaded fastener 143 that threadedly engages a threaded aperture 147i in the bottom 149c of the clamp body 149.

As the threaded fastener 143 threadedly engages the clamp body 149, it moves into the clamp body 149 and closes the distance between the top portion 140a of the clamping mechanism 140 (i.e., the end of the threaded fastener 143) and the pair of slot-shaped openings (i.e., slot-shaped opening 149d and slot-shaped opening 149e). If a rail and return flange were received in the clamp body 149 as previously described, tightening the threaded fastener 143 would press the rail up against the return flange and clamp the return flange to the rail.

Alternative Clamp Bodies

In the examples given, the clamp body 109 of FIGS. 3-10, 19-24 as well as clamp body 149 of FIGS. 25 and 26 are enclosed on four sides. For example, in FIGS. 7 and 8, the pair of sides, first side 109a and second side 109b extend downward from opposite edges of top 109i. The pair of sides, first side 109a and second side 109b similarly extends upward from the bottom 109c.

Figure 27:
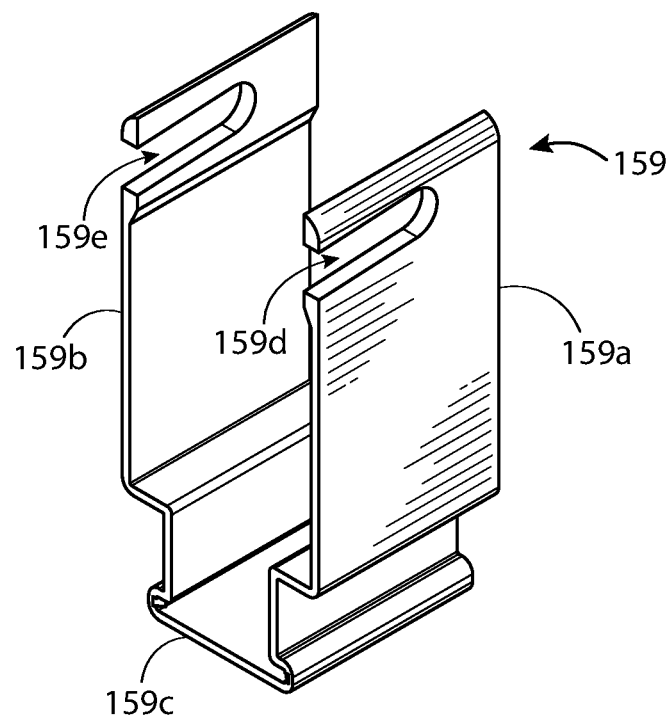
FIG. 27 illustrates, in front left orthographic and exploded view, an alternative example of a clamp body.
Figure 28:
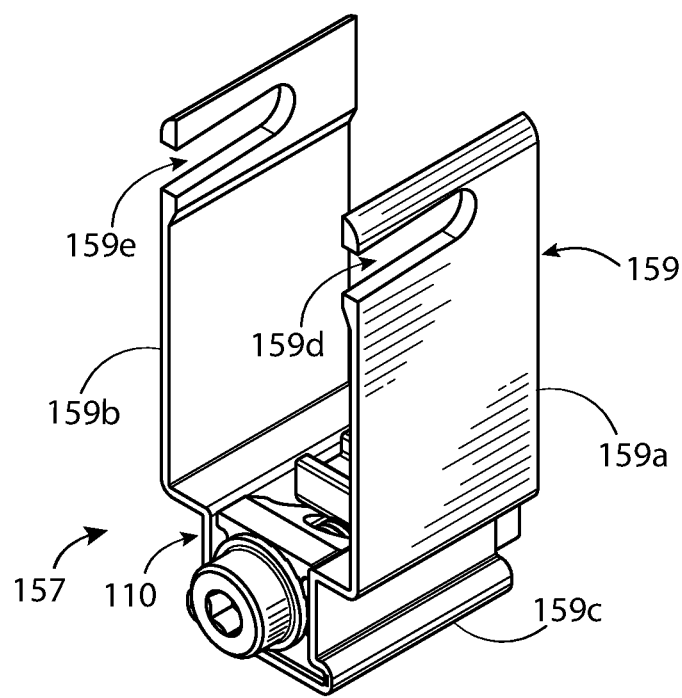
FIG. 28 illustrates, in front left orthographic view, the solar panel bottom clamp of FIG. 27 being applied to the clamping mechanism of FIG. 10.

FIGS. 27 and 28 illustrate the clamp body 159 that is open on the top. The clamp body includes a pair of sides, first side 159a and second side 159b extending upward from the bottom 159c. The pair of sides includes a corresponding pair of slot-shaped openings, slot-shaped opening 159d and slot-shaped opening 159e. Slot-shaped opening 159d and slot-shaped opening 159e are open on one end so they can receive a return flange of a solar panel in the same way as described for FIGS. 5-8.

The clamp body 159 can be readily substituted for clamp body 109 of FIGS. 3-10, 19-24 and clamp body 149 of FIGS. 25 and 26. As an example, FIG. 28 illustrates solar panel bottom clamp 157 with clamp body 159 and clamping mechanism 110 of FIGS. 3-10. Similarly, the clamp body 159 can be used with clamping mechanism 120 of FIGS. 19-22, clamping mechanism 130 of FIGS. 23 and 24, and clamping mechanism 140 of FIGS. and 26.

The clamp body 109 of FIGS. 3-10 and 19-24, clamp body 149 of FIGS. 25 and 26, and clamp body 159 of FIGS. 27 and 28 include sides that are indented inward before terminating at the bottom of the clamp body. For clamp body 109 of FIGS. 3-10 and 19-24 as well as clamp body 149 of FIGS. 27 and 28, this is to help capture the stationary member of the clamping mechanism, i.e., the first wedge 114 of FIGS. 5, 6, 9, and 10, the stationary nut 129 of FIGS. 19, 20 and 22, and the stationary nut 139 of FIGS. 23 and 24. In FIGS. 25 and 26, this indented portion is solid, allowing for a longer and stronger threaded aperture. The clamp body is not limited to these configurations illustrated. The clamp body can be any shape that is capable of receiving a rail below the pair of slot-shaped openings in their corresponding pair of sides of the clamp body, capturing a solar panel return flange in the slot-shaped openings, and enabling a clamping mechanism to press the rail and return flange against the upper edges of the slot-shaped openings.

For example, the clamp body could have a rectangular cross section. The clamp body could alternatively have a u-shaped cross section with an open top. In either case, the stationary member of the clamping mechanism could be secured to the bottom of the clamp body. For example, the clamping mechanism could be captured in grooves or channels in the bottom of the clamp body. The inside surface of the clamp body could also be flat. The stationary member could be secured to the clamp body by threaded fasteners extending upward through the bottom of the clamp body and into the stationary member or downward through the stationary member into the bottom of the clamp body. The stationary member could also be secured to the bottom by adhesive or by permanent tape.

CONCLUSION

Described are devices for mounting solar panels to rails as well a systems that include such devices, solar panels, rails, and other solar panel racking system components. This disclosure describes general principles in terms of one example and then has applied these general principles to a number of examples. These examples represent a sample that show how the general principles can be applied. The description is not exhaustive and not exclusive. Other variations are possible. As shown, elements from one example can be applied to another. The solar panel bottom clamp 107 of FIGS. 3-10 is not mutually exclusive of the solar panel bottom clamp 127 of FIGS. 19-22, and the solar panel bottom clamp 137 of FIGS. 23 and 24. The clamping mechanisms can be exchanged. The clamp body 159 of FIGS. 27 and 28 can be exchanged for the clamp body 109 of FIGS. 3-10 and 19-24. In addition, the clamp body 149 of FIGS. 25 and 26 can be modified to embody the principles of the clamp body 159 of FIGS. 27 and 28 by removing the top.

The variations described, the general principles taught, as well as undescribed variations, devices, and systems that encompass at least some of the general principles described in this disclosure, are within the scope of the claims.

What is claimed is:

1. A device for securing a solar panel to a rail, comprising:
a clamp body that includes a bottom, and a first side and a second side each extending upward from the bottom;
a pair of slot-shaped openings that includes a first slot-shaped opening that is open on a first end and extends widthwise into the first side, and a second slot-shaped opening that is open on a second end and extends widthwise into the second side;
a clamping mechanism at least partially positioned within the clamp body, the clamping mechanism includes a threaded fastener and a movable member made movable by the threaded fastener to selectively narrow a distance between a top portion of the clamping mechanism and the pair of slot-shaped openings; and
the clamping mechanism includes first wedge secured to the clamp body with a portion of the threaded fastener passing through the first wedge, and a second wedge made movable up along the first wedge by threadedly engaging the threaded fastener to selectively narrow the distance between the top portion of the clamping mechanism and the pair of slot-shaped openings.

2. The device of claim 1, wherein:
a portion of the threaded fastener enters the clamp body above the bottom and between the first side and the second side and engages the movable member.

3. The device of claim 2, wherein:
the threaded fastener threadedly engages the movable member to selectively narrow a distance between a top portion of the clamping mechanism and the pair of slot-shaped openings.

4. The device of claim 1, wherein:
the clamping mechanism includes a stationary member secured to the clamp body, positioned between the first side and the second side, and positioned above the bottom; and
a portion of the threaded fastener passes through the stationary member and engages the movable member to selectively narrow the distance between the top portion of the clamping mechanism and the pair of slot-shaped openings.

5. The device of claim 1, wherein:
the clamp body includes a top positioned above the pair of slot-shaped openings; and the first side and the second side each extending downward from the top.

6. A device for clamping a return flange of a solar panel to a rail, comprising:
a clamp body that includes a bottom and a pair of sides extending upward from the bottom, the pair of sides includes a corresponding pair of slot-shaped openings sized and shaped to receive the return flange;

a clamping mechanism at least partially positioned within the clamp body, the clamping mechanism includes a threaded fastener, and a movable member;

the clamp body is sized and shaped to receive the rail below the pair of slot-shaped openings and above the clamping mechanism; and with the return flange being received by the slot-shaped openings and the rail being received by the clamp body, the movable member made movable by the threaded fastener selectively presses the rail upward against the return flange.

7. The device of claim 6, wherein:

a portion of the threaded fastener enters the clamp body above the bottom and between the pair of sides and engages the movable member.

8. The device of claim 7, wherein:

the threaded fastener threadedly engages the movable member to selectively narrow a distance between a top portion of the clamping mechanism and the pair of slot-shaped openings.

9. The device of claim 6, wherein:

the clamping mechanism includes a stationary member secured to the clamp body, positioned between the pair of sides, and positioned above the bottom; and a portion of the threaded fastener passes through the stationary member, and engages the movable member to selectively press the rail upward against the return flange.

10. The device of claim 6, wherein:

the clamping mechanism includes a first wedge held stationary within the clamp body and a portion of the threaded fastener passing through the first wedge, and a second wedge; and with the return flange being received by the slot-shaped openings and with the rail being received by the clamp body, the second wedge made movable along the first wedge by threadedly engaging the threaded fastener to selectively presses the rail upward against the return flange.

11. The device of claim 6, wherein:

the clamp body includes a top positioned above the pair of slot-shaped openings; and the sides extending downward from the top.

12. A system, comprising:

a solar panel that includes a return flange;

a rail;

a solar panel bottom clamp that includes a clamp body and a clamping mechanism;

the clamp body includes a bottom and a pair of sides extending upward from the bottom, the pair of sides includes a corresponding pair of slot-shaped openings sized and shaped to receive the return flange;

the clamping mechanism is at least partially positioned within the clamp body and includes a threaded fastener and a movable member; and the clamp body receives the rail below the pair of slot-shaped openings and above the clamping mechanism, and the movable member made movable by the threaded fastener, selectively presses and secures the rail upward against the return flange.

13. The system of claim 12, wherein:

a portion of the threaded fastener enters the clamp body above the bottom and between the pair of sides and engages the movable member.

14. The system of claim 13, wherein:

the threaded fastener threadedly engages the movable member to selectively narrow a distance between a top portion of the clamping mechanism and the pair of slot-shaped openings.

15. The system of claim 12, wherein:

the clamping mechanism includes a stationary member secured to the clamp body, positioned between the pair of sides, and positioned above the bottom; and a portion of the threaded fastener passes through the stationary member, and engages the movable member to selectively press the rail upward against the return flange.

16. The system of claim 12, wherein:

the clamping mechanism includes a first wedge held stationary within the clamp body with a portion of the threaded fastener passing through the first wedge, and a second wedge made movable along the first wedge by threadedly engaging the threaded fastener to selectively press the rail upward against the return flange.

17. The system of claim 12, wherein:

the clamp body includes a top positioned above the pair of slot-shaped openings; and the sides extending downward from the top.

* * * * *